United States Patent
He et al.

(10) Patent No.: US 10,923,720 B2
(45) Date of Patent: Feb. 16, 2021

(54) GRAPHENE-ENABLED SELENIUM CATHODE ACTIVE MATERIAL FOR AN ALKALI METAL-SELENIUM SECONDARY BATTERY

(71) Applicant: Nanotek Instruments, Inc., Dayton, OH (US)

(72) Inventors: Hui He, Dayton, OH (US); Aruna Zhamu, Springboro, OH (US); Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 155 days.

(21) Appl. No.: 15/948,326

(22) Filed: Apr. 9, 2018

(65) Prior Publication Data

US 2019/0312276 A1     Oct. 10, 2019

(51) Int. Cl.
*H01M 4/583* (2010.01)
*H01M 4/133* (2010.01)
(Continued)

(52) U.S. Cl.
CPC ........... *H01M 4/583* (2013.01); *C01B 32/184* (2017.08); *H01M 4/133* (2013.01);
(Continued)

(58) Field of Classification Search
CPC .. H01M 4/583; H01M 10/0525; H01M 4/133; H01M 2004/021; H01M 2004/028; H01M 10/054; H01M 10/052; H01M 4/38; H01M 4/364; H01M 4/587; C01B 32/184; C01B 2204/22; C01B 2204/32;
(Continued)

(56) References Cited

U.S. PATENT DOCUMENTS

| 2010/0143798 A1* | 6/2010 | Zhamu | H01M 4/587 |
| | | | 429/212 |
| 2015/0064575 A1* | 3/2015 | He | H01M 10/0568 |
| | | | 429/300 |
| 2017/0338472 A1* | 11/2017 | Zhamu | H01M 4/366 |

FOREIGN PATENT DOCUMENTS

WO     2017139078 A1    8/2017

OTHER PUBLICATIONS

An et al., "Diameter-Selected Synthesis of Single Crystalline Trigonal Selenium Nanowires" Materials Chemistry and Physics (2007) vol. 101, No. 2-3, pp. 357-361.

(Continued)

*Primary Examiner* — Andrew J. Oyer

(57) ABSTRACT

A graphene-enabled hybrid particulate for use as a cathode active material of an alkali metal-selenium battery, wherein the hybrid particulate is composed of a single or a plurality of graphene sheets and one or a plurality of fine selenium particles or coatings, having a diameter or thickness from 0.5 nm to 10 μm, and the graphene sheets and the selenium particles or coatings are mutually bonded or agglomerated into a hybrid particulate containing an exterior graphene sheet or multiple exterior graphene sheets embracing the selenium particles or coatings, and wherein the hybrid particulate has an electrical conductivity no less than $10^{-4}$ S/cm and the graphene amount is from 0.01% to 30% by weight based on the total weight of graphene and selenium combined. Typically and desirably, the hybrid particulate is substantially spherical or ellipsoidal in shape.

34 Claims, 5 Drawing Sheets

Primary particles (Se or Se mixture, alloy, or compound) as the cathode active material Interior graphene sheets helping to form electron-conducting pathways Exterior graphene sheets embracing internal primary particles and internal graphene sheets to form a secondary particle (particulate)

(51) Int. Cl.
| | |
|---|---|
| *C01B 32/184* | (2017.01) |
| *H01M 10/0525* | (2010.01) |
| *H01M 4/02* | (2006.01) |
| *H01M 10/052* | (2010.01) |
| *H01M 10/054* | (2010.01) |
| *H01M 4/36* | (2006.01) |
| *H01M 4/38* | (2006.01) |
| *H01M 4/587* | (2010.01) |
| *C01B 32/194* | (2017.01) |

(52) U.S. Cl.
CPC ..... *H01M 10/0525* (2013.01); *C01B 2204/22* (2013.01); *C01B 2204/32* (2013.01); *C01P 2004/32* (2013.01); *C01P 2004/61* (2013.01); *C01P 2006/40* (2013.01); *H01M 2004/021* (2013.01); *H01M 2004/028* (2013.01)

(58) Field of Classification Search
CPC ............... C01B 32/194; C01P 2004/32; C01P 2006/40; C01P 2004/61
See application file for complete search history.

(56) References Cited

OTHER PUBLICATIONS

An et al., "Large-Scale Synthesis of High Quality Trigonal Selenium Nanowires" European Journal of Inorganic Chemistry (2003) vol. 17, pp. 3250-3255.

Chen et al., "Selenium nanowires and nanotubes synthesized via a facile template-free solution method" Materials Research Bulletin (2010) vol. 45, pp. 699-704.

Diwivedi et al., "An Organic Acid-induced Synthesis and Characterization of Selenium Nanoparticles" Journal of Nanotechnology (2011) Article ID 651971, 6 pages.

Fan et al., "Hollow selenium encapsulated into 3D graphene hydrogels for lithium-selenium batteries with high rate performance and cycling stability" RSC Adv. (2017) vol. 7, pp. 21281-21286.

Gao et al., "Hollow Sphere Selenium Nanoparticles: Their In-Vitro Anti Hydroxyl Radical Effect" Advanced Materials (2002), vol. 14, No. 4, pp. 290-293.

Karlicky et al., "Halogenated Graphenes: Rapidly Growing Family of Graphene Derivatives" ACS Nano (2013) vol. 7, No. 8, pp. 6434-6464.

Li et al., "Mixed Surfactant Template Method for Preparation of Nanometer Selenium" E-Journal of Chemistry (2009) vol. 6, No. S1, pp. S304-S310.

Lin et al., "Observation in the Growth of Selenium Nanoparticles" Journal of Chinese Chemical Society (2004) vol. 51, No. 2, pp. 239-242.

Luesakul et al., "Shape-controlled synthesis of cubic-like selenium nanoparticles via the self-assembly method" Carbohydrate Polymers (2016) vol. 153, pp. 435-444.

Zeng et al., "Solvothermal synthesis of trigonal selenium with butterfly-like microstructure" Particuology (2013) vol. 11, No. 5, pp. 614-617.

Zhang et al., "Synthesis of selenium nanoparticles in the presence of polysaccharides" Materials Letters (2004) vol. 58, No. 21, pp. 2590-2594.

PCT/US19/26515 International Search Report and Written Opinion dated Jul. 24, 2019, 16 pages.

U.S. Appl. No. 15/948,385 Nonfinal Office Action dated Jan. 14, 2020, 6 pages.

* cited by examiner

GRAPHENE-ENABLED SELENIUM CATHODE ACTIVE MATERIAL FOR AN ALKALI METAL-SELENIUM SECONDARY BATTERY

FIELD OF THE INVENTION

The present invention is related to a unique cathode composition and cathode structure in a secondary or rechargeable alkali metal-selenium battery, including the lithium-selenium battery, sodium-selenium battery, and potassium-selenium battery, and a process for producing same.

BACKGROUND

Rechargeable lithium-ion (Li-ion) and lithium metal batteries (including Li-sulfur and Li metal-air batteries) are considered promising power sources for electric vehicle (EV), hybrid electric vehicle (HEV), and portable electronic devices, such as lap-top computers and mobile phones. Lithium as a metal element has the highest capacity (3,861 mAh/g) compared to any other metal or metal-intercalated compound as an anode active material (except $Li_{4.4}Si$, which has a specific capacity of 4,200 mAh/g). Hence, in general, Li metal batteries have a significantly higher energy density than lithium ion batteries.

Historically, rechargeable lithium metal batteries were produced using non-lithiated compounds having relatively high specific capacities, such as $TiS_2$, $MoS_2$, $MnO_2$, $CoO_2$, and $V_2O_5$, as the cathode active materials, which were coupled with a lithium metal anode. When the battery was discharged, lithium ions were transferred from the lithium metal anode through the electrolyte to the cathode, and the cathode became lithiated. Unfortunately, upon repeated charges/discharges, the lithium metal resulted in the formation of dendrites at the anode that ultimately grew to penetrate through the separator, causing internal shorting and explosion. As a result of a series of accidents associated with this problem, the production of these types of secondary batteries was stopped in the early 1990's, giving ways to lithium-ion batteries.

In lithium-ion batteries, pure lithium metal sheet or film was replaced by carbonaceous materials as the anode. The carbonaceous material absorbs lithium (through intercalation of lithium ions or atoms between graphene planes, for instance) and desorbs lithium ions during the re-charge and discharge phases, respectively, of the lithium ion battery operation. The carbonaceous material may comprise primarily graphite that can be intercalated with lithium and the resulting graphite intercalation compound may be expressed as $Li_xC_6$, where x is typically less than 1.

Although lithium-ion (Li-ion) batteries are promising energy storage devices for electric drive vehicles, state-of-the-art Li-ion batteries have yet to meet the cost and performance targets. Li-ion cells typically use a lithium transition-metal oxide or phosphate as a positive electrode (cathode) that de/re-intercalates $Li^+$ at a high potential with respect to the carbon negative electrode (anode). The specific capacity of lithium transition-metal oxide or phosphate based cathode active material is typically in the range from 140-180 mAh/g. As a result, the specific energy of commercially available Li-ion cells is typically in the range from 120-240 Wh/kg, most. These specific energy values are two to three times lower than what would be required for battery-powered electric vehicles to be widely accepted.

With the rapid development of hybrid (HEV), plug-in hybrid electric vehicles (HEV), and all-battery electric vehicles (EV), there is an urgent need for anode and cathode materials that provide a rechargeable battery with a significantly higher specific energy, higher energy density, higher rate capability, long cycle life, and safety. Two of the most promising energy storage devices are the lithium-sulfur (Li—S) cell and lithium-selenium (Li—Se) cell since the theoretical capacity of Li is 3,861 mAh/g, that of S is 1,675 mAh/g, and that of Se is 675 mAh/g. Compared with conventional intercalation-based Li-ion batteries, Li—S and Li—Se cells have the opportunity to provide a significantly higher energy density (a product of capacity and voltage). With a significantly higher electronic conductivity, Se is a more effective cathode active material and, as such, Li—Se potentially can exhibit a higher rate capability.

However, Li—Se cell is plagued with several major technical problems that have hindered its widespread commercialization:

(1) All prior art Li—Se cells have dendrite formation and related internal shorting issues;

(2) The cell tends to exhibit significant capacity decay during discharge-charge cycling. This is mainly due to the high solubility of selenium and lithium poly selenide anions formed as reaction intermediates during both discharge and charge processes in the polar organic solvents used in electrolytes. During cycling, the anions can migrate through the separator to the Li negative electrode whereupon they are reduced to solid precipitates, causing active mass loss. In addition, the solid product that precipitates on the surface of the positive electrode during discharge becomes electrochemically irreversible, which also contributes to active mass loss. This phenomenon is commonly referred to as the Shuttle Effect. This process leads to several problems: high self-discharge rates, loss of cathode capacity, corrosion of current collectors and electrical leads leading to loss of electrical contact to active cell components, fouling of the anode surface giving rise to malfunction of the anode, and clogging of the pores in the cell membrane separator which leads to loss of ion transport and large increases in internal resistance in the cell.

(3) Presumably, nanostructured mesoporous carbon materials could be used to hold the Se or lithium polyselenide in their pores, preventing large out-flux of these species from the porous carbon structure through the electrolyte into the anode. However, the fabrication of the proposed highly ordered mesoporous carbon structure requires a tedious and expensive template-assisted process. It is also challenging to load a large proportion of selenium into the mesoscaled pores of these materials using a physical vapor deposition or solution precipitation process. Typically the maximum loading of Se in these porous carbon structures is less than 50% by weight (i.e. the amount of active material is less than 50%; more than 50% being inactive materials).

Despite the various approaches proposed for the fabrication of high energy density Li—Se cells, there remains a need for cathode materials, production processes, and cell operation methods that retard the out-diffusion of Se or lithium polyselenide from the cathode compartments into other components in these cells, improve the utilization of electro-active cathode materials (Se utilization efficiency), and provide rechargeable Li—Se cells with high capacities over a large number of cycles.

Most significantly, lithium metal (including pure lithium, lithium alloys of high lithium content with other metal elements, or lithium-containing compounds with a high lithium content; e.g. >80% or preferably >90% by weight Li) still provides the highest anode specific capacity as compared to essentially all other anode active materials (except pure silicon, but silicon has pulverization issues). Lithium metal would be an ideal anode material in a lithium-selenium secondary battery if dendrite related issues could be addressed.

Sodium metal (Na) and potassium metal (K) have similar chemical characteristics to Li and the selenium cathode in sodium-selenium cells (Na—Se batteries) or potassium-selenium cells (K—Se) face the same issues observed in Li—S batteries, such as: (i) low active material utilization rate, (ii) poor cycle life, and (iii) low Coulumbic efficiency. Again, these drawbacks arise mainly from insulating nature of Se, dissolution of polyselenide intermediates in liquid electrolytes (and related Shuttle effect), and large volume change during charge/discharge.

Hence, an object of the present invention is to provide a rechargeable Li—Se battery that exhibits an exceptionally high specific energy or high energy density. One particular technical goal of the present invention is to provide a Li metal-selenium or Li ion-selenium cell with a cell specific energy greater than 300 Wh/kg, preferably greater than 350 Wh/kg, and more preferably greater than 400 Wh/kg (all based on the total cell weight).

It may be noted that in most of the open literature reports (scientific papers) and patent documents, scientists or inventors choose to express the cathode specific capacity based on the selenium or lithium polyselenide weight alone (not the total cathode composite weight), but unfortunately a large proportion of non-active materials (those not capable of storing lithium, such as conductive additive and binder) is typically used in their Li—Se cells. For practical use purposes, it is more meaningful to use the cathode composite weight-based capacity value.

A specific object of the present invention is to provide a rechargeable lithium-selenium cell based on rational materials and battery designs that overcome or significantly reduce the following issues commonly associated with conventional Li—Se cells: (a) dendrite formation (internal shorting); (b) low electric and ionic conductivities of selenium, requiring large proportion (typically 30-55%) of non-active conductive fillers and having significant proportion of non-accessible or non-reachable selenium or lithium polyselenide); (c) dissolution of lithium polyselenide in electrolyte and migration of dissolved lithium polyselenide from the cathode to the anode (which irreversibly react with lithium at the anode), resulting in active material loss and capacity decay (the shuttle effect); and (d) short cycle life.

In addition to overcoming the aforementioned problems, another object of the present invention is to provide a simple, cost-effective, and easy-to-implement approach to preventing potential Li metal dendrite-induced internal short circuit and thermal runaway problems in Li metal-selenide batteries.

SUMMARY OF THE INVENTION

The present invention provides a graphene-enabled hybrid particulate for use as an alkali metal battery cathode active material, wherein the hybrid particulate is formed of a single or a plurality of graphene sheets and a single or a plurality of fine selenium particles or coatings, having a diameter or thickness from 0.5 nm to 20 μm (preferably from 0.5 nm to 100 nm), and the graphene sheets and the selenium particles or coatings are mutually bonded or agglomerated into the hybrid particulate containing an exterior graphene sheet or multiple exterior graphene sheets embracing the selenium particles or coatings, and wherein the hybrid particulate has an electrical conductivity no less than $10^{-4}$ S/cm (preferably greater than $10^{-2}$ S/cm) and the graphene is in an amount of from 0.01% to 30% by weight (preferably from 0.1% to 10%) based on the total weight of graphene and selenium combined.

The graphene sheets preferably contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In certain preferred embodiments, the hybrid particulate further contains interior graphene sheets in physical contact with the selenium particles or coatings and with the exterior graphene sheet or sheets.

In certain embodiments, the invention provides a graphene-enabled hybrid particulate for use as an alkali metal battery cathode active material, wherein the hybrid particulate is formed of a single or a plurality of graphene sheets and a single selenium particle, having a diameter or thickness from 0.5 nm to 30 μm, and the graphene sheet or plurality of graphene sheets encapsulate the selenium particle and wherein the graphene sheets contain a pristine graphene material having less than 0.01% by weight of non-carbon elements or a non-pristine graphene material having 0.01% to 20% by weight of non-carbon elements, wherein the non-pristine graphene is not graphene oxide or reduced graphene oxide and is selected from graphene fluoride, graphene chloride, graphene bromide, graphene iodide, hydrogenated graphene, nitrogenated graphene, boron-doped graphene, nitrogen-doped graphene, chemically functionalized graphene, or a combination thereof. In these configurations, one Se particle is wrapped around or encapsulated by one sheet or several sheets of graphene.

The particulate may further comprise a second element selected from Sn, Sb, Bi, S, Te, or a combination thereof and the weight of the second element is less than the weight of selenium. This second element is combined with selenium to form a mixture, alloy, or compound.

The hybrid particulate may have a diameter from 100 nm to 100 μm preferably from 1.0 μm to 50 μm, and more preferably from 3.0 μm to 30 μm. The hybrid particulate preferably has a substantially spherical or ellipsoidal shape.

The selenium particles may be in a form of a nanowire, nanotube, nanodisc, nanoribbon, nanobelt, or nanoplatelet having a diameter or thickness smaller than 100 nm.

The hybrid particulate may further comprise a carbon material in electronic contact with said selenium and a graphene sheet.

In certain embodiments, the hybrid particulate may further comprise a carbon material coated on at least one of said selenium particles or coatings, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

In certain embodiments, the chemically functionalized graphene sheets in the hybrid particulate contain a functional group attached thereto to make the graphene sheets in a liquid medium exhibit a negative Zeta potential from −55 mV to −0.1 mV. In certain embodiments, the chemically functionalized graphene sheets do not include graphene oxide (reduced or un-reduced graphene oxide).

The chemically functionalized graphene sheets may have a chemical functional group selected from alkyl or aryl silane, alkyl or aralkyl group, hydroxyl group, carboxyl group, carboxylic group, amine group, sulfonate group (—SO$_3$H), aldehydic group, quinoidal, fluorocarbon, or a combination thereof.

In certain embodiments, the chemically functionalized graphene comprises graphene sheets having a chemical functional group selected from a derivative of an azide compound selected from the group consisting of 2-azido-ethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R=any one of the following groups,

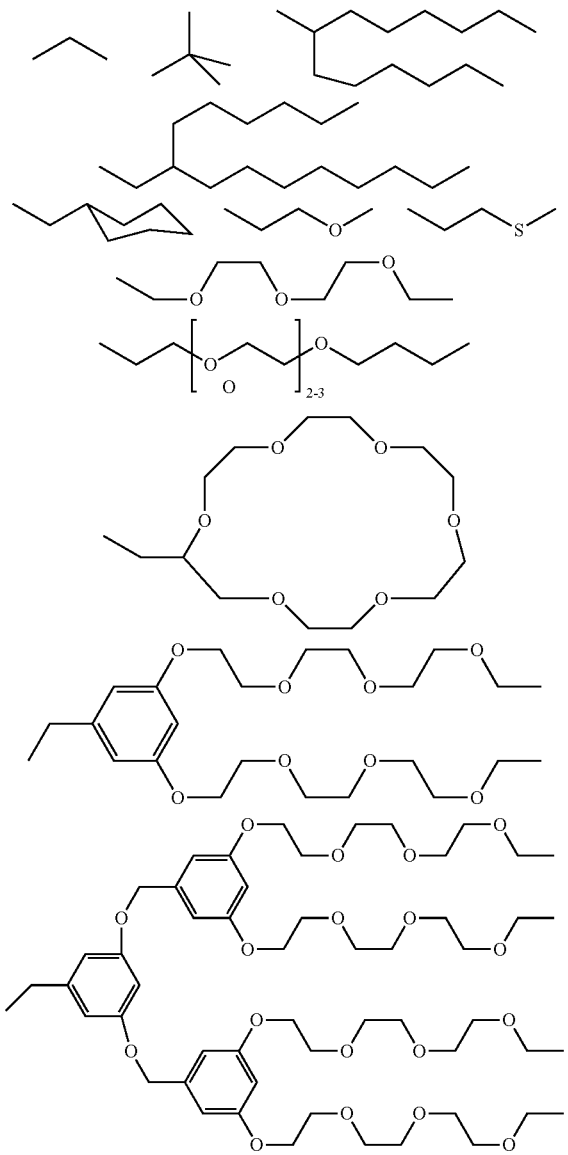

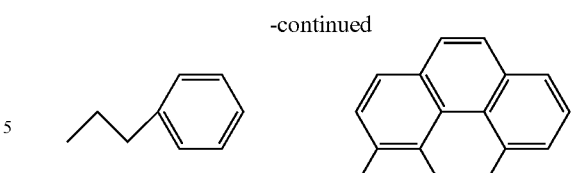

and combinations thereof.

In certain embodiments, the chemically functionalized graphene comprises graphene sheets having a chemical functional group selected from an oxygenated group selected from the group consisting of hydroxyl, peroxide, ether, keto, and aldehyde.

In some preferred embodiments, the chemically functionalized graphene comprises graphene sheets having a chemical functional group selected from the group consisting of —SO$_3$H, —COOH, —NH$_2$, —OH, —R'CHOH, —CHO, —CN, —COCl, halide, —COSH, —SH, —COOR', —SR', —SiR'$_3$, —Si(—OR'—)$_y$R'$_3$-y, —Si(—O—SiR'$_2$—)OR', —R", Li, AlR'$_2$, Hg—X, TlZ$_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

In some embodiments, the chemically functionalized graphene comprises graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

The chemically functionalized graphene may comprise graphene sheets having a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—NR'$_2$, R'SH, R'CHO, R'CN, R'X, R'N+(R')$_3$X—, R'SiR'$_3$, R'Si(—OR'—)$_y$R'$_{3y}$, R'Si(—O—SiR'$_2$—)OR', R'—R", R'—N—CO, (C$_2$H$_4$O—)$_w$H, (—C$_3$H$_6$O—)$_w$H, (—C$_2$H$_4$O)$_w$—R', (C$_3$H$_6$O)$_w$—R', R', and w is an integer greater than one and less than 200.

The invention also provides a powder mass containing a plurality of the invented hybrid particulates as defined above. Also provided is an alkali metal-selenium battery cathode containing the invented hybrid particulate as a cathode active material.

The invention also provides an alkali metal-selenium battery containing an anode, a cathode, an electrolyte in ionic contact with the cathode and the anode, wherein the cathode comprises the invented hybrid particulate described above. In certain embodiments, the invented alkali metal-selenium battery further comprises an anode current collector and/or a cathode current collector. The alkali metal-selenium battery may contain a rechargeable lithium-selenium cell, sodium-selenium cell, potassium-selenium cell, lithium ion-selenium cell, sodium ion-selenium cell, or potassium ion-selenium cell.

In the invented alkali metal-selenium battery, the electrolyte may be selected from polymer electrolyte, polymer gel electrolyte, composite electrolyte, ionic liquid electrolyte, non-aqueous liquid electrolyte, soft matter phase electrolyte, solid-state electrolyte, or a combination thereof.

The electrolyte may contain an alkali salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium (LiN($CF_3SO_2$)$_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium (NaN($CF_3SO_2$)$_2$), sodium trifluoromethanesulfonimide (NaTFSI), bis-trifluoromethyl sulfonylimide potassium (KN($CF_3SO_2$)$_2$), or a combination thereof.

In the alkali metal-selenium battery, the solvent may be selected from ethylene carbonate (EC), dimethyl carbonate (DMC), methylethyl carbonate (MEC), diethyl carbonate (DEC), ethyl propionate, methyl propionate, propylene carbonate (PC), γ-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

The invention also includes a process for producing the graphene-enabled hybrid particulates. In certain embodiments of the present invention, the process comprises (a) preparing a precursor mixture of graphene (or graphene precursor) with selenium or a selenium compound; (b) dispensing the precursor mixture into secondary particles (particulates); and (c) thermally and/or chemically converting the precursor mixture particulates to the graphene-enhanced hybrid particulates. The resulting hybrid particulate is typically composed of a single or a plurality of graphene sheets and a single or a plurality of fine selenium particles or coatings, having a diameter or thickness from 0.5 nm to 10 m (preferably from 0.5 nm to 100 nm), and the graphene sheets and the selenium particles or coatings are mutually bonded or agglomerated into the hybrid particulate containing an exterior graphene sheet or multiple exterior graphene sheets embracing the selenium particles or coatings, and wherein the hybrid particulate has an electrical conductivity no less than $10^{-4}$ S/cm (preferably greater than $10^{-2}$ S/cm) and the graphene is in an amount of from 0.01% to 30% by weight (preferably from 0.1% to 10%) based on the total weight of graphene and selenium combined.

The step of preparing a precursor mixture preferably comprises preparing a suspension of graphene in a liquid medium and mixing selenium particles or selenium compound in the suspension to form a multi-component suspension. The process preferably further comprises a step of drying the multi-component suspension to form the precursor mixture. If this drying process includes using a spray-drying, spray-pyrolysis, ultrasonic-spraying, or fluidized-bed drying procedure, the dried mixture is in a form of the hybrid particulates. This drying step is typically followed by a step of converting, which can involve a sintering, heat-treatment, spray-pyrolysis, or fluidized bed drying or heating procedure. The step of converting may also comprise a procedure of chemically or thermally reducing the graphene oxide (GO) to reduce or eliminate oxygen content and other non-carbon elements of the graphene precursor. Most preferably, the final heat treatment or sintering of the precursor to the Se cathode active material is conducted concurrently with the thermal reduction step of graphene oxide. Both treatments can be conducted at 700° C., for instance.

A commonly used chemical method of producing graphene involves producing graphene oxide (GO) or graphene fluoride first, which is then chemically or thermally reduced to graphene. The graphene sheets in the graphene-enhanced particulate typically have an oxygen content less than 25% by weight and can have an oxygen content less than 5% by weight. Most typically, the graphene sheet has an oxygen content in the range from 5% to 25% by weight.

The step of preparing the precursor mixture may comprise: A) dispersing or exposing a laminar graphite material in a fluid of an intercalant and/or an oxidant to obtain a graphite intercalation compound (GIC) or graphite oxide (GO); B) exposing the resulting GIC or GO to a thermal shock at temperature for a period of time sufficient to obtain exfoliated graphite or graphite worms; C) dispersing the exfoliated graphite or graphite worms in a liquid medium containing an acid, an oxidizing agent, and/or an organic solvent at a desired temperature for a duration of time until the exfoliated graphite is converted into a graphene oxide dissolved in the liquid medium to form a graphene solution; D) adding a desired amount of the cathode active material or its precursor (Se or selenium compound) to the graphene solution to form the precursor mixture in a suspension, slurry or paste form.

Alternatively, the step of preparing the precursor mixture comprises: (a) preparing a suspension containing pristine nanographene platelets (NGPs) dispersed in a liquid medium; (b) adding an acid and/or an oxidizing agent into the suspension at a temperature for a period of time sufficient to obtain a graphene solution or suspension; and (c) adding a desired amount of cathode active material or precursor in the graphene solution or suspension to form a paste or slurry. The cathode active material refers to Se or its mixture, alloy, or compound with a second element (such as Sn, Sb, Bi, S, Te, or a combination thereof). The cathode active material precursor refers to a precursor to Se or its mixture, alloy, or compound. The precursor typically contains a selenium salt (e.g. $Na_2SeO_3$).

Thus, in certain embodiments, the invention provides a process for producing graphene-enabled hybrid particulates for use as a cathode active material of an alkali metal battery, the process comprising: (a) preparing a mixture suspension of graphene sheets and a selenium material dispersed in a liquid medium; and (b) dispensing and forming the mixture suspension into the hybrid particulates, wherein at least one of the hybrid particulates comprises a single or a plurality of graphene sheets and a plurality of fine selenium particles or coatings, having a diameter or thickness from 0.5 nm to 10 μm, and the graphene sheets and the selenium particles or coatings are mutually bonded or agglomerated into the hybrid particulate containing an exterior graphene sheet or multiple exterior graphene sheets embracing the selenium particles or coatings, and wherein the graphene is in an amount of from 0.01% to 30% by weight based on the total weight of graphene and selenium combined.

Preferably, the graphene sheets contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof. They can be single-layer graphene or few-layer graphene (having 2-10 graphene planes).

In certain embodiments, the process comprises: (a) preparing a mixture suspension of graphene sheets and a selenium material dispersed in a liquid medium; and (b) dispensing and forming the mixture suspension into hybrid particulates, wherein at least one of the hybrid particulates comprises a single or a plurality of graphene sheets and a fine selenium particle, having a diameter or thickness from 0.5 nm to 30 µm, and the graphene sheet or plurality of graphene sheets encapsulate the selenium particle and wherein the graphene sheets contain a pristine graphene material having less than 0.01% by weight of non-carbon elements or a non-pristine graphene material having 0.01% to 20% by weight of non-carbon elements, wherein said non-pristine graphene is not graphene oxide or reduced graphene oxide and is selected from graphene fluoride, graphene chloride, graphene bromide, graphene iodide, hydrogenated graphene, nitrogenated graphene, boron-doped graphene, nitrogen-doped graphene, chemically functionalized graphene, or a combination thereof and wherein said graphene is in an amount of from 0.01% to 30% by weight based on the total weight of graphene and selenium combined.

The selenium material may be selected from Se, or a combination of Se with a second element selected from Sn, Sb, Bi, S, Te, or a combination thereof and the weight of the second element is less than the weight of Se. The selenium material may contain a selenium precursor, which can be a reacting mass or just contain a selenium salt.

DESCRIPTION OF THE PREFERRED EMBODIMENTS

Figure 1:
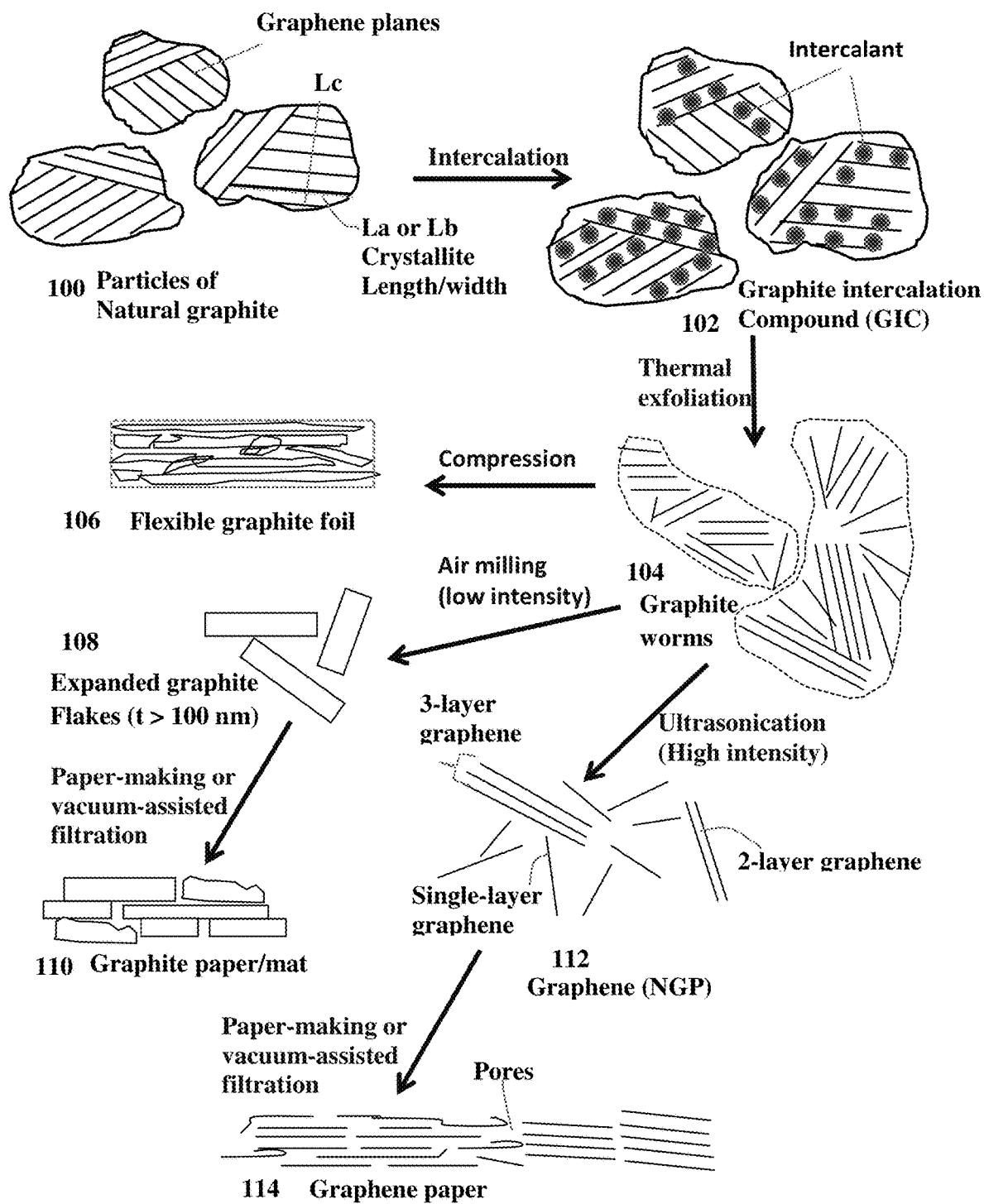
FIG. 1 Schematic drawing illustrating the processes for producing conventional paper, mat, film, and membrane of simply aggregated graphite flakes/platelets or graphene sheets. All processes begin with intercalation and/or oxidation treatment of graphitic materials (e.g. natural graphite particles).

For convenience, the following discussion of preferred embodiments is primarily based on cathodes for Li—Se cells, but the same or similar methods are applicable to deposition of Se in the cathode for the Na—Se and K—Se cells. Examples are presented for Li—Se cells, Na—Se cells, and K—Se cells.

The present invention provides a graphene-enabled hybrid particulate for use as an alkali metal battery cathode active material. The hybrid particulate is composed of a single or a plurality of graphene sheets and a single or a plurality of fine selenium particles or coatings, having a diameter or thickness from 0.5 nm to 30 m (preferably no greater than 10 m and more from 0.5 nm to 100 nm), and the graphene sheets and the selenium particles or coatings are mutually bonded or agglomerated into the hybrid particulate containing an exterior graphene sheet or multiple exterior graphene sheets embracing the selenium particles or coatings, and wherein the hybrid particulate has an electrical conductivity no less than $10^{-4}$ S/cm (preferably greater than $10^{-2}$ S/cm) and the graphene is in an amount of from 0.01% to 30% by weight (preferably from 0.1% to 10%) based on the total weight of graphene and selenium combined.

In some embodiments, there are multiple Se particles or coatings that are wrapped around by one or multiple graphene sheets to form a particulate; i.e. one particulate can contain several Se particle or coatings therein.

The graphene sheets preferably contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

In certain preferred embodiments, the hybrid particulate further contains interior graphene sheets in physical contact with the selenium particles or coatings and with the exterior graphene sheet or sheets. Such a particulate contains both interior graphene sheets and exterior graphene sheets.

In certain embodiments, the invention provides a graphene-enabled hybrid particulate for use as an alkali metal battery cathode active material, wherein the hybrid particulate comprises a single or a plurality of graphene sheets and a single selenium particle, having a diameter or thickness from 0.5 nm to 10 µm, and the graphene sheet or plurality of graphene sheets encapsulate the selenium particle and wherein the graphene sheets contain a pristine graphene material having less than 0.01% by weight of non-carbon elements or a non-pristine graphene material having 0.01% to 20% by weight of non-carbon elements, wherein the non-pristine graphene is not graphene oxide or reduced graphene oxide and is selected from graphene fluoride, graphene chloride, graphene bromide, graphene iodide, hydrogenated graphene, nitrogenated graphene, boron-doped graphene, nitrogen-doped graphene, chemically functionalized graphene, or a combination thereof. In such a particulate, one Se particle is wrapped around or encapsulated by one sheet or several sheets of graphene.

The particulate may further comprise a second element selected from Sn, Sb, Bi, S, Te, or a combination thereof and the weight of the second element is less than the weight of selenium. This second element is combined with selenium to form a mixture, alloy, or compound.

The hybrid particulate may have a diameter from 100 nm to 100 m preferably from 1.0 µm to 50 µm, and more preferably from 3.0 µm to 30 µm. The hybrid particulate preferably has a substantially spherical or ellipsoidal shape.

The selenium preferably occupies a weight fraction of 40%-95% based on the total weight of the graphene sheets and selenium combined. The selenium coating or particles preferably have a thickness or diameter from 0.5 nm to 100 nm (more preferably from 1 nm to 10 nm). The hybrid particulate may further accommodate a second element selected from Sn, Sb, Bi, S, Te, or a combination thereof and the weight of the second element is less than the weight of selenium. The second element may be mixed with selenium (Se) to form a mixture, alloy, or a compound. The second element, the mixture, the alloy, or the compound may be preferably in a nanoparticle or nanocoating form having a diameter or thickness from 0.5 nm to 100 nm.

In certain embodiments, the hybrid particulate can optionally further contain a carbon or graphite filler selected from a carbon or graphite fiber, carbon or graphite nanofiber, carbon nanotube, carbon nanorod, mesophase carbon particle, mesocarbon microbead, expanded graphite flake, needle coke, carbon black or acetylene black, activated carbon, or a combination thereof.

Figure 2A:
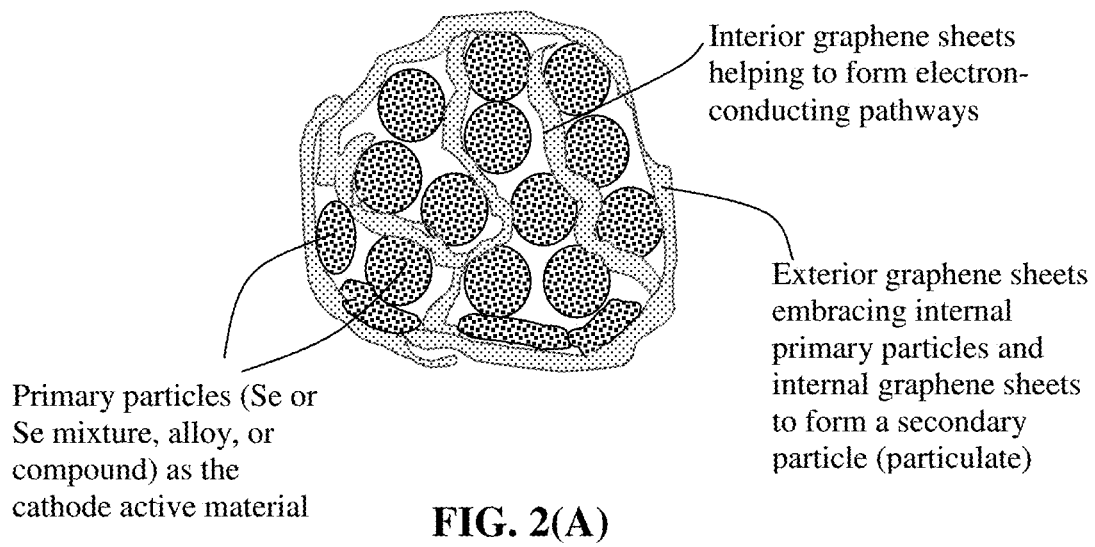
FIG. 2(A) Schematic of a graphene-enhanced hybrid particulate according to a embodiment of the present invention.
Figure 2B:
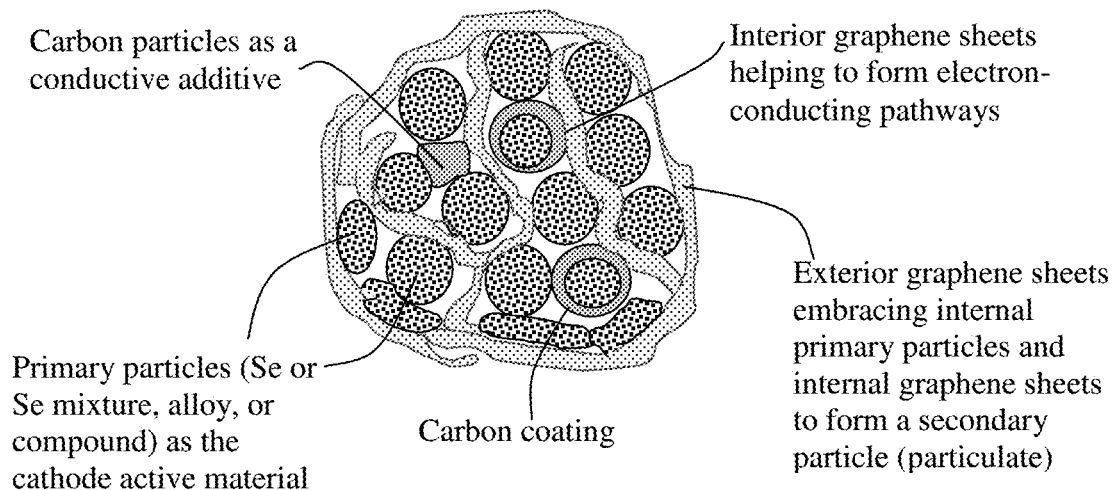
FIG. 2 (B) another particulate according to another embodiment of the present invention (containing some carbon component).

As a summary of certain embodiments, this invention provides a graphene-enhanced particulate for use as a lithium battery cathode active material. As illustrated in FIG. 2(A), the particulate is formed of a single or a plurality of graphene sheets and a plurality of fine cathode active material particles (primary particles of Se or its alloy or compound with a second element) with a size smaller than 10 µm (preferably and typically smaller than 1 µm, further preferably and typically <100 nm, and most preferably and typically <10 nm). The graphene sheets and the primary particles are mutually bonded or agglomerated into the particulate (also referred to as a secondary particle) with an exterior graphene sheet or multiple graphene sheets embracing the cathode active material particles. Some graphene sheets get incorporated into the interior of the particulate (herein referred to as internal or interior graphene sheets), providing additional electron-conducting paths. FIG. 2(B) shows another preferred embodiment, wherein an additional conductive additive (such as carbon black particles, carbon coating, or conducting polymer coating) is incorporated in the particulate.

The resulting particulate typically has an electrical conductivity no less than $10^{-4}$ S/cm (typically and preferably greater than $10^{-2}$ S/cm). The graphene component is in an amount of from 0.01% to 30% by weight (preferably between 0.1% to 20% by weight and more preferably between 0.5% and 10%) based on the total weight of graphene and the cathode active material combined. With the processes herein invented, the particulates tend to be approximately spherical or ellipsoidal in shape, which is a desirable feature.

The present invention also provides a process for producing the graphene-enabled hybrid particulates. In certain embodiments, the process comprises (a) preparing a precursor mixture of graphene (or graphene precursor) with selenium or a selenium compound (e.g. sodium selenite, $Na_2SeO_3$) dispersed or dissolved in a liquid medium to form a precursor graphene mixture dispersion (suspension or slurry); (b) dispensing and forming the precursor graphene mixture dispersion into secondary particles (the precursor mixture particulates); and (c) thermally and/or chemically converting the precursor mixture particulates to the graphene-enhanced hybrid particulates. The resulting hybrid particulate is typically composed of a single or a plurality of graphene sheets and a single or a plurality of fine selenium particles or coatings, having a diameter or thickness from 0.5 nm to 10 m (preferably from 0.5 nm to 100 nm), and the graphene sheets and the selenium particles or coatings are mutually bonded or agglomerated into the hybrid particulate containing an exterior graphene sheet or multiple exterior graphene sheets embracing the selenium particles or coatings, and wherein the hybrid particulate has an electrical conductivity no less than $10^{-4}$ S/cm (preferably greater than $10^{-2}$ S/cm) and the graphene is in an amount of from 0.01% to 30% by weight (preferably from 0.1% to 10%) based on the total weight of graphene and selenium combined Some details about how to prepare precursor graphene mixture dispersion in step (a) of the invented process are presented below.

The graphite intercalation compound (GIC) or graphite oxide may be obtained by immersing powders or filaments of a starting graphitic material in an intercalating/oxidizing liquid medium (e.g. a mixture of sulfuric acid, nitric acid, and potassium permanganate) in a reaction vessel. The starting graphitic material may be selected from natural graphite, artificial graphite, mesophase carbon, mesophase pitch, mesocarbon microbead, soft carbon, hard carbon, coke, carbon fiber, carbon nanofiber, carbon nanotube, or a combination thereof.

When the starting graphite powders or filaments are mixed in the intercalating/oxidizing liquid medium, the resulting slurry is a heterogeneous suspension and appears dark and opaque. When the oxidation of graphite proceeds at a reaction temperature for a sufficient length of time (4-120 hours at room temperature, 20-25° C.), the reacting mass can eventually become a suspension that appears slightly green and yellowish, but remain opaque. If the degree of oxidation is sufficiently high (e.g. having an oxygen content between 20% and 50% by weight, preferably between 30% and 50%) and all the original graphene planes are fully oxidized, exfoliated and separated to the extent that each oxidized graphene plane (now a graphene oxide sheet or molecule) is surrounded by the molecules of the liquid medium, one obtains a GO gel.

The aforementioned features are further described and explained in detail as follows: As illustrated in FIG. 1, a graphite particle (e.g. 100) is typically composed of multiple graphite crystallites or grains. A graphite crystallite is made up of layer planes of hexagonal networks of carbon atoms. These layer planes of hexagonally arranged carbon atoms are substantially flat and are oriented or ordered so as to be substantially parallel and equidistant to one another in a particular crystallite. These layers of hexagonal-structured carbon atoms, commonly referred to as graphene layers or basal planes, are weakly bonded together in their thickness direction (crystallographic c-axis direction) by weak van der Waals forces and groups of these graphene layers are arranged in crystallites. The graphite crystallite structure is usually characterized in terms of two axes or directions: the c-axis direction and the a-axis (or b-axis) direction. The c-axis is the direction perpendicular to the basal planes. The a- or b-axes are the directions parallel to the basal planes (perpendicular to the c-axis direction).

A highly ordered graphite particle can consist of crystallites of a considerable size, having a length of $L_a$ along the crystallographic a-axis direction, a width of $L_b$ along the crystallographic b-axis direction, and a thickness $L_c$ along the crystallographic c-axis direction. The constituent graphene planes of a crystallite are highly aligned or oriented with respect to each other and, hence, these anisotropic structures give rise to many properties that are highly directional. For instance, the thermal and electrical conductivity of a crystallite are of great magnitude along the plane directions (a- or b-axis directions), but relatively low in the perpendicular direction (c-axis). As illustrated in the upper-left portion of FIG. 1, different crystallites in a graphite particle are typically oriented in different directions and, hence, a particular property of a multi-crystallite graphite particle is the directional average value of all the constituent crystallites.

Due to the weak van der Waals forces holding the parallel graphene layers, natural graphite can be treated so that the spacing between the graphene layers can be appreciably opened up so as to provide a marked expansion in the c-axis direction, and thus form an expanded graphite structure in which the laminar character of the carbon layers is substantially retained. The process for manufacturing flexible graphite is well-known in the art. In general, flakes of natural graphite (e.g. 100 in FIG. 1) are intercalated in an acid solution to produce graphite intercalation compounds (GICs, 102). The GICs are washed, dried, and then exfoliated by exposure to a high temperature for a short period of time. This causes the flakes to expand or exfoliate in the c-axis direction of the graphite up to 80-300 times of their original dimensions. The exfoliated graphite flakes are vermiform in appearance and, hence, are commonly referred to as worms 104. These worms of graphite flakes which have been greatly expanded can be formed without the use of a binder into cohesive or integrated sheets of expanded graphite, e.g. webs, papers, strips, tapes, foils, mats or the like (typically referred to as "flexible graphite" 106) having a typical density of about 0.04-2.0 g/cm³ for most applications.

In one prior art process, the exfoliated graphite (or mass of graphite worms) is re-compressed by using a calendaring or roll-pressing technique to obtain flexible graphite foils (106 in FIG. 1), which are typically 100-300 μm thick.

Largely due to the presence of defects, commercially available flexible graphite foils normally have an in-plane electrical conductivity of 1,000-3,000 S/cm, through-plane (thickness-direction or Z-direction) electrical conductivity of 15-30 S/cm, in-plane thermal conductivity of 140-300 W/mK, and through-plane thermal conductivity of approximately 10-30 W/mK. These defects are also responsible for the low mechanical strength (e.g. defects are potential stress concentration sites where cracks are preferentially initiated). These properties are inadequate for many thermal management applications and the present invention is made to address these issues. In another prior art process, the exfoliated graphite worm may be impregnated with a resin and then compressed and cured to form a flexible graphite composite, which is normally of low strength as well. In addition, upon resin impregnation, the electrical and thermal conductivity of the graphite worms could be reduced by two orders of magnitude.

Alternatively, the exfoliated graphite may be subjected to high-intensity mechanical shearing/separation treatments using a high-intensity air jet mill, high-intensity ball mill, or ultrasonic device to produce separated nanographene platelets (NGPs) with all the graphene platelets thinner than 100 nm, mostly thinner than 10 nm, and, in many cases, being single-layer graphene (also illustrated as 112 in FIG. 1). An NGP is composed of a graphene sheet or a plurality of graphene sheets with each sheet being a two-dimensional, hexagonal structure of carbon atoms.

Further alternatively, with a low-intensity shearing, graphite worms tend to be separated into the so-called expanded graphite flakes (108 in FIG. 1) having a thickness>100 nm. These flakes can be formed into graphite paper or mat 106 using a paper- or mat-making process. This expanded graphite paper or mat 106 is just a simple aggregate or stack of discrete flakes having defects, interruptions, and mis-orientations between these discrete flakes.

For the purpose of defining the geometry and orientation of an NGP, the NGP is described as having a length (the largest dimension), a width (the second largest dimension), and a thickness. The thickness is the smallest dimension, which is no greater than 100 nm, preferably smaller than 10 nm and most preferably 0.34 nm-1.7 nm in the present application. When the platelet is approximately circular in shape, the length and width are referred to as diameter. In the presently defined NGPs, both the length and width can be smaller than 1 μm, but can be larger than 200 μm.

A mass of multiple NGPs (including discrete sheets/platelets of single-layer and/or few-layer graphene or graphene oxide) may be readily dispersed in water or a solvent and then made into a graphene paper (114 in FIG. 1) using a paper-making process. Many discrete graphene sheets are folded or interrupted (not integrated), most of platelet orientations being not parallel to the paper surface. The existence of many defects or imperfections leads to poor electrical and thermal conductivity in both the in-plane and the through-plane (thickness-) directions.

Fluorinated graphene or graphene fluoride is herein used as an example of the halogenated graphene material group. There are two different approaches that have been followed to produce fluorinated graphene: (1) fluorination of pre-synthesized graphene: This approach entails treating graphene prepared by mechanical exfoliation or by CVD growth with fluorinating agent such as $XeF_2$, or F-based plasmas; (2) Exfoliation of multilayered graphite fluorides: Both mechanical exfoliation and liquid phase exfoliation of graphite fluoride can be readily accomplished [F. Karlicky, et al. "*Halogenated Graphenes: Rapidly Growing Family of Graphene Derivatives*" ACS Nano, 2013, 7 (8), pp 6434-6464].

Interaction of $F_2$ with graphite at high temperature leads to covalent graphite fluorides $(CF)_n$ or $(C_2F)_n$, while at low temperatures graphite intercalation compounds (GIC) $C_xF$ ($2 \leq x \leq 24$) form. In $(CF)_n$ carbon atoms are sp3-hybridized and thus the fluorocarbon layers are corrugated consisting of trans-linked cyclohexane chairs. In $(C_2F)_n$ only half of the C atoms are fluorinated and every pair of the adjacent carbon sheets are linked together by covalent C—C bonds. Systematic studies on the fluorination reaction showed that the resulting F/C ratio is largely dependent on the fluorination temperature, the partial pressure of the fluorine in the fluorinating gas, and physical characteristics of the graphite precursor, including the degree of graphitization, particle size, and specific surface area. In addition to fluorine ($F_2$), other fluorinating agents may be used, although most of the available literature involves fluorination with $F_2$ gas, sometimes in presence of fluorides.

For exfoliating a layered precursor material to the state of individual single graphene layers or few-layers, it is necessary to overcome the attractive forces between adjacent layers and to further stabilize the layers. This may be achieved by either covalent modification of the graphene surface by functional groups or by non-covalent modification using specific solvents, surfactants, polymers, or donor-acceptor aromatic molecules. The process of liquid phase exfoliation includes ultra-sonic treatment of a graphite fluoride in a liquid medium to produce graphene fluoride sheets dispersed in the liquid medium. The resulting dispersion can be directly made into a sheet of paper or a roll of paper.

The nitrogenation of graphene can be conducted by exposing a graphene material, such as graphene oxide, to ammonia at high temperatures (200-400° C.). Nitrogenated graphene could also be formed at lower temperatures by a hydrothermal method; e.g. by sealing GO and ammonia in an autoclave and then increased the temperature to 150-250° C. Other methods to synthesize nitrogen doped graphene include nitrogen plasma treatment on graphene, arc-discharge between graphite electrodes in the presence of ammonia, ammonolysis of graphene oxide under CVD conditions, and hydrothermal treatment of graphene oxide and urea at different temperatures.

For the purpose of defining the claims of the instant application, NGPs or graphene materials include discrete sheets/platelets of single-layer and multi-layer (typically less than 10 layers, the few-layer graphene) pristine graphene, graphene oxide, reduced graphene oxide (RGO), graphene fluoride, graphene chloride, graphene bromide, graphene iodide, hydrogenated graphene, nitrogenated graphene, chemically functionalized graphene, doped graphene (e.g. doped by B or N). Pristine graphene has essentially 0% oxygen. RGO typically has an oxygen content of 0.001%-5% by weight. Graphene oxide (including RGO) can have 0.001%-50% by weight of oxygen. Other than pristine graphene, all the graphene materials have 0.001%-50% by weight of non-carbon elements (e.g. O, H, N, B, F, Cl, Br, I, etc.). These materials are herein referred to as non-pristine graphene materials. The presently invented graphene-carbon foam can contain pristine or non-pristine graphene and the invented method allows for this flexibility.

Production of Se particles, from nanometer to micron scales, is well known in the art and fine Se powders are commercially available. Micron-scaled Se particles are easily produced using ball-milling if the initial powder size is too big. Due to the low melting point (221° C.) of Se, one can easily obtain Se melt and use a melt atomization technique to produce sub-micron Se particles, for instance. Various methods have been used in the past for synthesizing Se nanoparticle (SeNP), such as chemical reduction method, biological synthesis, solvothermal route, hydrothermal route, microwave assisted synthesis, green synthesis, electrodeposition method, and pulsed laser ablation method. The following references may be consulted for the details of several methods of producing SeNP:

1. Sheng-Yi Zhang, Juan Zhang, Hong-Yan Wang, Hong-Yuan Chen, "Synthesis of selenium nanoparticles in the presence of polysaccharides," Materials Letters, Volume 58, Issue 21, August 2004, Pages 2590-2594
2. Urarika Luesakul, Seamkwan Komenek, Songchan Puthong, Nongnuj Muangsin, "Shape-controlled synthesis of cubic-like selenium nanoparticles via the self-assembly method," Carbohydrate Polymers, Volume 153, 20 Nov. 2016, Pages 435-444.
3. C. Dwivedi, et al., "An Organic Acid-Induced Synthesis and Characterization of Selenium Nanoparticles," *Journal of Nanotechnology*, 2011: 1-6.
4. Lin, Z., Lin, F. and Wang, C.R.C. "Observation in the Growth of Selenium Nanoparticles," *Journal of Chinese Chemical Society*, 2004, 51 (2): 239-242.
5. Gao, B. X., Zhang, J. and Zhang, L., "Hollow Sphere Selenium Nanoparticles: Their In-Vitro Anti Hydroxyl Radical Effect," *Advanced Materials*, 14 (4), (2002) 290-293.
6. Li, Z. and Hua, P. 2009. "Mixed Surfactant Template Method for Preparation of Nanometer Selenium," *E-Journal of Chemistry* 6 (1) (2009) 304-310.
7. Chen, H., Shin, D., Nam, J., Kwon, K. and Yoo, J. 2010. "Selenium Nanowiresand Nanotubes Synthesized via a Facile Template-Free Solution Method," *Materials Research Bulletin* 45 (6) (2010) 699-704.)
8. Zeng, K., Chen, S., Song, Y., Li, H., Li, F. and Liu, P. 2013, "Solvothermal Synthesis of Trigonal Selenium with Butterfly-like Microstructure," *Particuology*, 11 (5) (2013) 614-617.)
9. An, C. and Wang, S. 2007. "Diameter-Selected Synthesis of Single Crystalline Trigonal Selenium Nanowires. ||*Materials Chemistry and Physics*, 2007, 101 (2-3): 357-361.
10. An, C., Tang, K., Liu, X. and Qian, Y., "Large-Scale Synthesis of High Quality Trigonal Selenium Nanowires. ||*European Journal of Inorganic Chemistry,*" 2003 (17): 3250-3255.

For instance, the chemical reduction method employs reduction of selenium salt using variety of reducing agents such as surfactants and biocompatible chemicals to obtain stabilized colloidal suspensions of nanoparticles. Various shapes and sizes of SeNP are synthesized using these methods. Chemical reduction method assists in maintaining better uniformity of the particles.

Dwivedi et al. [Ref. 3] used carboxylic acids like acetic acid, oxalic acid and aromatic acid (gallic acid) to synthesize SeNP of spherical shape and size 40-100 nm using sodium selenosulfate as the source of selenium. Lin et al. [Ref 4] used sulfur dioxide and SDS as reducing agents and selenous acid was used as a precursor to synthesize SeNP with a size range of 30-200 nm. Gao et al. [Ref. 5] used β-mercaptoethanol as a reducing agent producing hollow sphere SeNP (HSSN) of size 32 nm.

A mixed surfactant synthesis carried out by Li and Hua [Ref 6] showed the use of dihydroascorbic acid with sodium dodecyl sulfate and polyvinyl chloride to prepare SeNP of size 30 nm. A study reported by Chen et al. [Ref 7] used template free solution to prepare trigonal nanowires and nanotubes of 70-100 nm width and 180-350 nm respectively wherein, glucose was selected as a reducing agent and sodium selenite as the selenium source forming α-Se. Recrystallization of these SeNP without template or a surfactant resulted in the transformation of α-Se to t-Se.

The solvothermal or hydrothermal method employs usage of a solvent under high pressure and temperature that involves the interaction of precursors during synthesis. For instance, Zeng et al. [Ref. 8] synthesized nanoparticles using this method wherein, selenium was dissolved in ethylenediamine and kept in a Teflon coated autoclave maintaining the temperature at 160° C. for 2 hour and then cooled to RT to form a brown homogenous solution and then acetone stored at −18° C. was added to this solution to make it amorphous SeNP and further transforming it into trigonal selenium of hexagonal rod shaped structure. These particles on aging acquired a butterfly-like microstructure having 4 m in width and 8 m in length.

A study conducted by An & Wang [Ref. 9 and 10] showed synthesis of trigonal selenium Nano-wires of 10-60 nm in size using sodium selenite and thiosulfate salts as starting materials. Steam under pressure was used for the synthesis with a set temperature of 180° C.

Once the particles of Se are produced, they can be incorporated into a graphene-liquid medium suspension to make a graphene mixture suspension, dispersion or slurry. This suspension, dispersion, or slurry is then subjected to secondary particle formation treatment, such as spray-drying, spray-pyrolysis, ultrasonic spraying, and vibration-assisted droplet formation, to make the invented hybrid particulates.

Thus, the invention also provides a process for producing the graphene-enabled hybrid particulates. In certain embodiments of the present invention, the process comprises (a) preparing a suspension of a mixture of graphene with selenium (or Se mixture, alloy, or compound) dispersed in a liquid medium; and (b) dispensing and forming the mixture suspension into secondary particles (particulates). One may optionally heat treat these particulates to melt out the selenium or to vaporize selenium, allowing Se melt or vapor to permeate around inside the embracing (exterior) graphene sheets and re-deposit onto surfaces of these exterior graphene sheets and interior graphene sheets, if present, as Se coatings.

If the suspension contains a Se precursor, but not Se particles per se alone, an additional step of converting the precursor (e.g. a selenium salt) into Se particles or coating will be required. Thus, in certain embodiments, the process comprises (a) preparing a precursor mixture suspension of graphene with a selenium precursor dispersed or dissolved in a liquid medium; (b) dispensing and forming the precursor mixture into secondary particles (particulates) containing selenium precursor wrapped around by graphene sheets; and (c) thermally and/or chemically converting the precursor mixture particulates to the graphene-enhanced hybrid particulates.

In all these versions of the process, the resulting hybrid particulate is typically composed of a single graphene sheet or a plurality of graphene sheets and a single or a plurality of fine selenium particles or coatings, having a diameter or thickness from 0.5 nm to 10 μm (preferably from 0.5 nm to 100 nm), wherein the graphene sheets and the selenium particles or coatings are mutually bonded or agglomerated into the hybrid particulate containing an exterior graphene sheet or multiple exterior graphene sheets embracing the selenium particles or coatings, and wherein the hybrid particulate has an electrical conductivity no less than $10^{-4}$ S/cm (preferably greater than $10^{-2}$ S/cm) and the graphene is in an amount of from 0.01% to 30% by weight (preferably from 0.1% to 10%) based on the total weight of graphene and selenium combined. The electrical conductivity was measured with the well-known 4-point probe method on a powder block containing multiple hybrid particles compacted together.

The following examples serve to illustrate the best mode of practicing the invention and should not be construed as limiting the scope of the invention:

Example 1: Preparation of Se Nanoparticles from $SeO_2$ and Ascorbic Acid

The starting materials include $SeO_2$, ascorbic acid (Vc) and polysaccharides (CTS and CMC, separately). The CTS is a water-soluble chitosan having a 73.5% degree of deacetylation and viscosity-average molecular weight of 4200; and CMC is carboxymethyl cellulose having a degree of substitution of 0.8 and molecular weight of 110,000. The aqueous solutions of the materials were obtained by, for instance, dissolving 0.4 g of $SeO_2$ in 150 mL of de-ionized water under vigorous stirring.

For the preparation of selenium nanoparticles, appropriate amounts of polysaccharides, such as CTS or CMC solutions, were mixed with selenious acid solution (the aqueous solution of $SeO_2$), respectively. Subsequently, the ascorbic acid solution was added into the mixtures to initiate the reaction. In the reaction solution, the typical concentrations of CTS, CMC, selenious acid and ascorbic acid were 0.04%, 0.25%, $1\times10^3$ and $4\times10^3$ M, respectively. No stirring was conducted except the initial mixing of the reactants. The selenious acid solutions were converted from colorless to red gradually after the addition of the ascorbic acid. The resulting product mixtures were then dried in a vacuum oven to collect Se nanoparticle powders. The reactions may be accelerated by using a slightly higher temperature (e.g. 80° C. instead of room temperature) and/or assisted by ultrasonic treatment.

Two routes were followed to produce the hybrid particulate of graphene sheet-embraced Se particles. One was to complete the solid Se powder procedure and then added these Se nanoparticles into a graphene suspension (e.g. those prepared in Examples 7-12). The resulting slurry was then spray-dried to obtain the graphene-Se hybrid particulates. The other was to add graphene sheets (e.g. GO sheets dispersed in water) into the reacting mass of selenious acid solutions with ascorbic acid and then either allowing complete precipitation and coating of Se on graphene sheet surfaces prior to spray-drying or carrying out the spray-drying procedure to obtain precursor particulates, followed by completing the conversion process (from the selenious acid to Se).

It may be noted that the polysaccharide was used to stabilize the reacting mass and can be removed once the desired chemical reaction is completed. For instance, one may dissolve the polysaccharide component in water to recover neat Se particles. No polysaccharide will stay in the resulting hybrid particulate. Alternatively, one may choose to carbonize the polysaccharide (by heating the polysaccharide-Se composite or polysaccharide-Se-graphene hybrid) at one of the various stages to produce amorphous carbon coated on Se particle surfaces. The resulting hybrid particulates typically contain carbon-coated Se particles wrapped around by graphene sheets.

Example 2: Preparation of Se Nanoparticles and Graphene-Wrapped Se from $Na_2SeO_3$ and GO Hollow and solid Se nanospheres were produced from $Na_2SeO_3$ by varying the amount of cetyltrimethyl ammonium bromide (CTAB) in the reaction system. In a representative procedure, 0.025 mol of sodium selenite ($Na_2SeO_3$) and 0.05 mol of ascorbic acid were separately dissolved in 50 mL mixed solution (Vwater/Vethanol=1:1) with the assistance of CTAB at ambient temperature. After adding the ascorbic acid, the red solution turned to brick red. The color phenomenon was due to the formation of a-Se particles. After 18 h, the products were washed with water and absolute ethanol. Subsequently the product changed progressively from red to gray, indicating that the amorphous Se phase had transformed to a trigonal phase (t-Se). The content of CTAB could be changed to get different morphologies of the nano Se.

Upon completion of the Se nanoparticle formation procedure, the recovered Se nanoparticles (without removing water and ethanol) were added into a graphene oxide (GO)-water suspension (prepared in Example 10) to form a mixture slurry. The mixture slurry was then spray-dried to form the hybrid graphene-wrapped Se particulates.

On a separate basis, GO-water suspension was added into the reacting mass of $Na_2SeO_3$-ascorbib acid-CTBA solution. Prior to completion of the chemical reaction, the reacting mass (partially reacted) was spray-dried to form precursor particulates, which were further heated to complete the Se formation process.

Example 3: Preparation of Selenium Nanowires

Selenium nanowires were synthesized from $SeO_2$. In a typical reaction process, $SeO_2$ (0.25 g) and 3-cyclodextrin (0.25 g) were added into a glass beaker containing 50 mL distilled water. The mixture was stirred for about 10 min to give a clear solution, which was promptly poured into another glass beaker containing ascorbic acid solution (50 mL, 0.028M) under continuous stirring. After reacting for 4 h, the product was collected by centrifugation and washed with deionized water and absolute ethanol several times. Then it was re-dispersed in ethanol and allowed to age for 2 h without stirring. Subsequently, some of the products were dried in a vacuum at 60° C. for 5 h. Some of the Se nanowires dispersed in ethanol were poured into a graphene suspension to make a slurry, which was extruded out from a vibrating tubing to produce droplets of graphene-wrapped Se nanowires.

Example 4: Hydrothermal Synthesis of Se Nanowires from $(NH_4)_2S_2O_3$ and $Na_2SeO_3$ A low-temperature hydrothermal synthesis route was conducted for direct production of crystalline trigonal selenium nanowires, using $(NH_4)_2S_2O_3$ and $Na_2SeO_3$ as the starting materials in the presence of a surfactant, sodium dodecyl sulfate (SDS). In a typical procedure, equivalent molar amounts of $(NH_4)_2S_2)_3$ and $Na_2Se(O)_3$ (10 mmol) were added to an aqueous solution (50 mL) of SDS (0.325 g). The solution was stirred for approximately 20 min until the solids had completely dissolved, and a 0.2 M homogeneous solution was formed. The solution was then transferred to a Teflon-lined autoclave having a capacity of 60 mL. The autoclave was sealed and heated at 110° C. for 17 h, and then allowed to cool to room temperature naturally over a period of about 5 b. The resulting precipitate was rinsed with distilled water and absolute alcohol several times. After drying in vacuo at 40° C. for 4 h, the orange-red powders were collected. The hydrothermal synthesis of t-Se nanowires may be described by the following chemical reaction:

The product yield was approximately 95%.

Example 5: Preparation of Se Nanoplatelets

In a typical synthesis procedure, 1 mmol commercial Se powder and 20 mL ethylenediamine (EN) were poured into a Teflon-lined autoclave with a capacity of 30 mL. The autoclave was sealed and maintained at 160° C. for 2 h and then cooled to room temperature to yield a brown homogeneous solution. Subsequently, 100 mL acetone at −18° C. was injected into the brown homogeneous solution, and a brick-red mixture was obtained. After aging the brick-red mixture for 24 hours at −18° C., the precipitates were centrifuged, washed several times with distilled water and absolute alcohol, and finally dried in air at 60° C. for 24 h. The powder was then subjected to ball-milling for 30-60 minutes to obtain Se nanoplatelets. Some of the Se nanoplatelets were poured into a graphene suspension obtained in Example 9 to make a slurry, which was spray-dried to yield pristine graphene-wrapped Se nanoplatelets.

Example 6: Preparation of t-Selenium Nanowires and Nanotubes

In a typical procedure of synthesizing Se nanowires, 0.52 g $Na_2SeO_3$ and 2 g glucose were dissolved in 320 mL water hosted in a 500 mL beaker. After mixing for 20 min under vigorous magnetic stirring, the beaker containing the mixture solution was sealed and maintained in an oven at 85° C. A hot turbid brick-red solution was obtained, indicating the amorphous selenium being generated. The hot solution was cooled down by cold water in order to quench the reaction. The product was collected by entrifugation and washed several times with deionized water to remove the impurities. The final brick-red product was re-dispersed in 10 mL absolute ethanol to form a dispersion in a glass bottle, and then sealed and stored in darkness for further growth of Se nanowires. After this dispersion was aged for one week at room temperature, a sponge-like black-gray solid was formed at the bottom and the color of upper solution changed to colorless transparent.

The synthesis of Se nanotubes was performed under different conditions: 1.03 g $Na_2SeO_3$ and 3 g glucose were dissolved in 100 mL water hosted in a 250 mL beaker. After the solution was under constant stirring for 20 min, the beaker containing the mixture solution was sealed and then maintained at 85° C. for 4 h in an oven.

Example 7: Preparation of Graphene Oxide Sheets

Chopped graphite fibers with an average diameter of 12 μm and natural graphite particles were separately used as a starting material, which was immersed in a mixture of concentrated sulfuric acid, nitric acid, and potassium permanganate (as the chemical intercalate and oxidizer) to prepare graphite intercalation compounds (GICs). The starting material was first dried in a vacuum oven for 24 h at 80° C. Then, a mixture of concentrated sulfuric acid, fuming nitric acid, and potassium permanganate (at a weight ratio of 4:1:0.05) was slowly added, under appropriate cooling and stirring, to a three-neck flask containing fiber segments. After 5-16 hours of reaction, the acid-treated graphite fibers or natural graphite particles were filtered and washed thoroughly with deionized water until the pH level of the solution reached 6. After being dried at 100° C. overnight, the resulting graphite intercalation compound (GIC) or graphite oxide fiber was re-dispersed in water and/or alcohol to form a slurry.

In one sample, five grams of the graphite oxide fibers were mixed with 2,000 ml alcohol solution consisting of alcohol and distilled water with a ratio of 15:85 to obtain a slurry mass. Then, the mixture slurry was subjected to ultrasonic irradiation with a power of 200 W for various lengths of time. After 20 minutes of sonication, GO fibers were effectively exfoliated and separated into thin graphene oxide sheets with oxygen content of approximately 23%-

31% by weight. The resulting suspension contains GO sheets being suspended in water.

Example 8: Preparation of Single-Layer Graphene Sheets from Mesocarbon Micro-Beads (MCMBs)

Mesocarbon microbeads (MCMBs) were supplied from China Steel Chemical Co., Kaohsiung, Taiwan. This material has a density of about 2.24 g/cm$^3$ with a median particle size of about 16 μm. MCMB (10 grams) were intercalated with an acid solution (sulfuric acid, nitric acid, and potassium permanganate at a ratio of 4:1:0.05) for 48-96 hours. Upon completion of the reaction, the mixture was poured into deionized water and filtered. The intercalated MCMBs were repeatedly washed in a 5% solution of HCl to remove most of the sulfate ions. The sample was then washed repeatedly with deionized water until the pH of the filtrate was no less than 4.5. The slurry was then subjected ultrasonication for 10-100 minutes to produce GO suspensions. TEM and atomic force microscopic studies indicate that most of the GO sheets were single-layer graphene when the oxidation treatment exceeded 72 hours, and 2- or 3-layer graphene when the oxidation time was from 48 to 72 hours.

The GO sheets contain oxygen proportion of approximately 35%-47% by weight for oxidation treatment times of 48-96 hours. GO sheets were suspended in water. In several samples, selenium particles were added into the GO suspension prior to the spray-drying procedure.

Example 9: Preparation of Pristine Graphene Foam (0% Oxygen)

Recognizing the possibility of the high defect population in GO sheets acting to reduce the conductivity of individual graphene plane, we decided to study if the use of pristine graphene sheets (non-oxidized and oxygen-free, non-halogenated and halogen-free, etc.) can lead to a graphene foam having a higher thermal conductivity. Pristine graphene sheets were produced by using the direct ultrasonication or liquid-phase production process.

In a typical procedure, five grams of graphite flakes, ground to approximately 20 μm or less in sizes, were dispersed in 1,000 mL of deionized water (containing 0.1% by weight of a dispersing agent, Zonyl® FSO from DuPont) to obtain a suspension. An ultrasonic energy level of 85 W (Branson S450 Ultrasonicator) was used for exfoliation, separation, and size reduction of graphene sheets for a period of 15 minutes to 2 hours. The resulting graphene sheets are pristine graphene that have never been oxidized and are oxygen-free and relatively defect-free. There are no other non-carbon elements.

Again, selenium was introduced into the graphene-wrapped particles in two ways: One involved adding Se particles into the graphene suspension, followed by spray-drying. The other involved adding Se precursor solution into the graphene suspension to form a precursor slurry, which was spray-dried to yield precursor particulates. The precursor particulates were then then heated to allow for complete conversion.

Example 10: Preparation of Graphene Oxide (GO) Suspension from Natural Graphite Graphite oxide was prepared by oxidation of graphite flakes with an oxidizer liquid consisting of sulfuric acid, sodium nitrate, and potassium permanganate at a ratio of 4:1:0.05 at 30° C. When natural graphite flakes (particle sizes of 14 μm) were immersed and dispersed in the oxidizer mixture liquid for 48 hours, the suspension or slurry appears and remains optically opaque and dark. After 48 hours, the reacting mass was rinsed with water 3 times to adjust the pH value to at least 3.0. A final amount of water was then added to prepare a series of GO-water suspensions. We observed that GO sheets form a liquid crystal phase when GO sheets occupy a weight fraction >3% and typically from 5% to 15%.

Example 11: Preparation of Graphene Fluoride

Several processes have been used by us to produce GF, but only one process is herein described as an example. In a typical procedure, highly exfoliated graphite (HEG) was prepared from intercalated compound $C_2F \cdot xClF_3$. HEG was further fluorinated by vapors of chlorine trifluoride to yield fluorinated highly exfoliated graphite (FHEG). Pre-cooled Teflon reactor was filled with 20-30 mL of liquid pre-cooled $ClF_3$, the reactor was closed and cooled to liquid nitrogen temperature. Then, no more than 1 g of HEG was put in a container with holes for $ClF_3$ gas to access and situated inside the reactor. In 7-10 days a gray-beige product with approximate formula $C_2F$ was formed.

Subsequently, a small amount of FHEG (approximately 0.5 mg) was mixed with 20-30 mL of an organic solvent (methanol, ethanol, 1-propanol, 2-propanol, 1-butanol, tert-butanol, isoamyl alcohol) and subjected to an ultrasound treatment (280 W) for 30 min, leading to the formation of homogeneous yellowish dispersions. Five minutes of sonication was enough to obtain a relatively homogenous dispersion, but longer sonication time ensured better stability. Subsequently, Se nanoparticles (e.g. spherical particles or nanowires) were added into the dispersion to make a slurry for subsequent particulate formation.

Example 12: Preparation of Nitrogenated Graphene

Graphene oxide (GO), synthesized in Example 10, was finely ground with different proportions of urea and the pelletized mixture heated in a microwave reactor (900 W) for 30 s. The product was washed several times with deionized water and vacuum dried. In this method graphene oxide gets simultaneously reduced and doped with nitrogen. The products obtained with graphene:urea mass ratios of 1:0.5, 1:1 and 1:2 are designated as NGO-1, NGO-2 and NGO-3 respectively and the nitrogen contents of these samples were 14.7, 18.2 and 17.5 wt % respectively as found by elemental analysis. These nitrogenated graphene sheets remain dispersible in water. The resulting suspensions were then used for mixing with Se or its precursor for particulate production.

Figure 3:
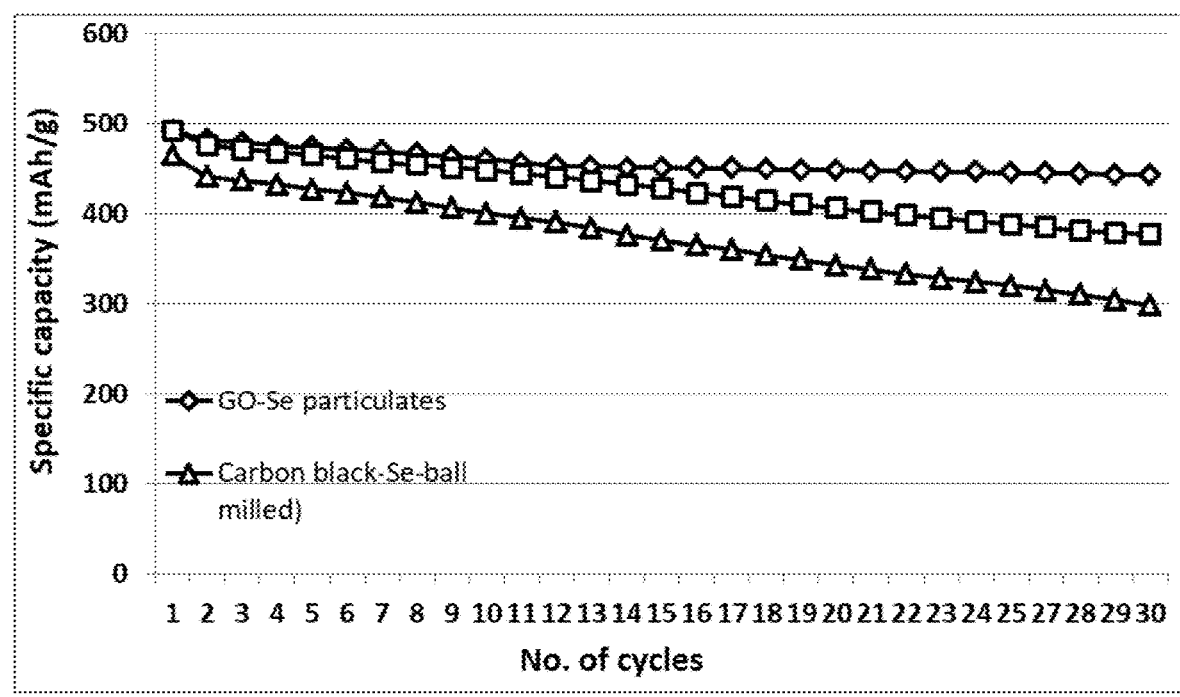
FIG. 3 The charge and discharge cycling results of three Li—Se cells, one containing a presently invented cathode structure of RGO-wrapped Se particulates, the second containing a cathode structure of a simple mixture of graphene sheets and Se particles, and the third containing a cathode prepared by ball-milling a mixture of Se powder and carbon black powder.
Figure 4:
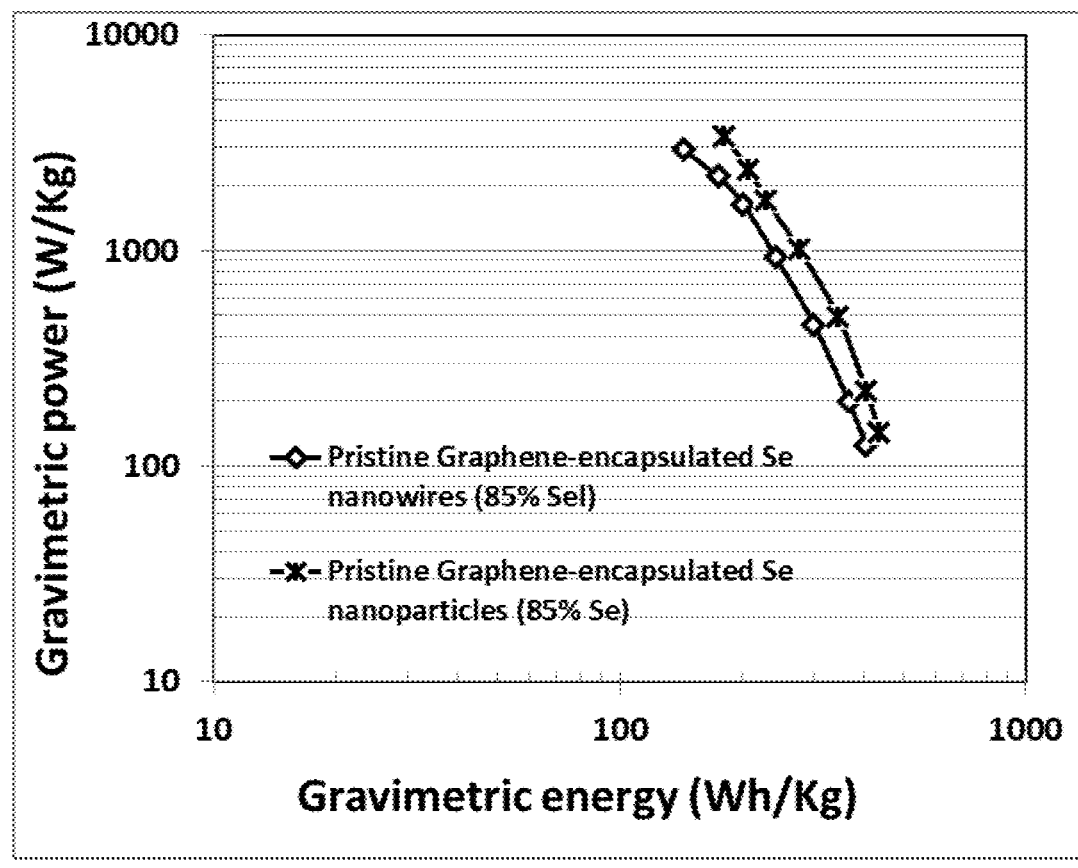
FIG. 4 Ragone plots (cell power density vs. cell energy density) of two Li metal-selenium cells: one containing pristine graphene encapsulated Se nanoparticles and the other pristine graphene-encapsulated Se nanowires.

Example 13: Chemical Functionalization of Pristine Graphene and Nitrogenated Graphene Foam Specimens of pristine graphene foam and nitrogenated graphene foam prepared earlier were subjected to functionalization by bringing these specimens in chemical contact with chemical compounds such as carboxylic acids, azide compound (2-azidoethanol), alkyl silane, diethylenetriamine (DETA), and chemical species containing hydroxyl group, carboxyl group, amine group, and sulfonate group ($—SO_3H$) in a liquid or solution form. We have observed that there is high affinity of selenium with these functional groups (particularly, $—NH2$, $C=O$, $—COO$, and $—C—N—$ groups), which promote good chemical bonding or attachment of Se to graphene surfaces and facilitate formation of graphene-wrapped hybrid particulates containing both exterior and interior graphene sheets.

Example 14: Electrochemical Behaviors of Li—Se, Na—Se, and K—Se Cells Shown in FIG. 3 are charge/discharge cycling responses of three Li—Se cells; one cell containing a presently invented cathode structure of RGO-wrapped Se particulates, the second containing a cathode structure of a simple mixture of graphene sheets and Se particles, and the third cell containing a cathode prepared by ball-milling a mixture of Se powder and carbon black powder. Clearly, the presently invented cathode layer featuring the graphene-encapsulation approach leads to a much more stable cycling behavior given approximately the same Se amount in the cathode. Simple mixing of graphene with Se particles leads to some improvement over the conventional cathode prepared by ball-milling of carbon black particles and Se particles. However, such an improvement is not adequate to making the Li—Se cell technically feasible. FIG. 4 shows the Ragone plots (cell power density vs. cell energy density) of two Li metal-selenium cells, one containing pristine graphene encapsulated Se nanoparticles and the other pristine graphene-encapsulated Se nanowires. Both types of batteries are capable of delivering a high energy density (e.g. as high as 436 Wh/kg, much higher than those of conventional lithium-ion batteries) and a high power density (e.g. as high as 3,366 W/kg).

Figure 5:
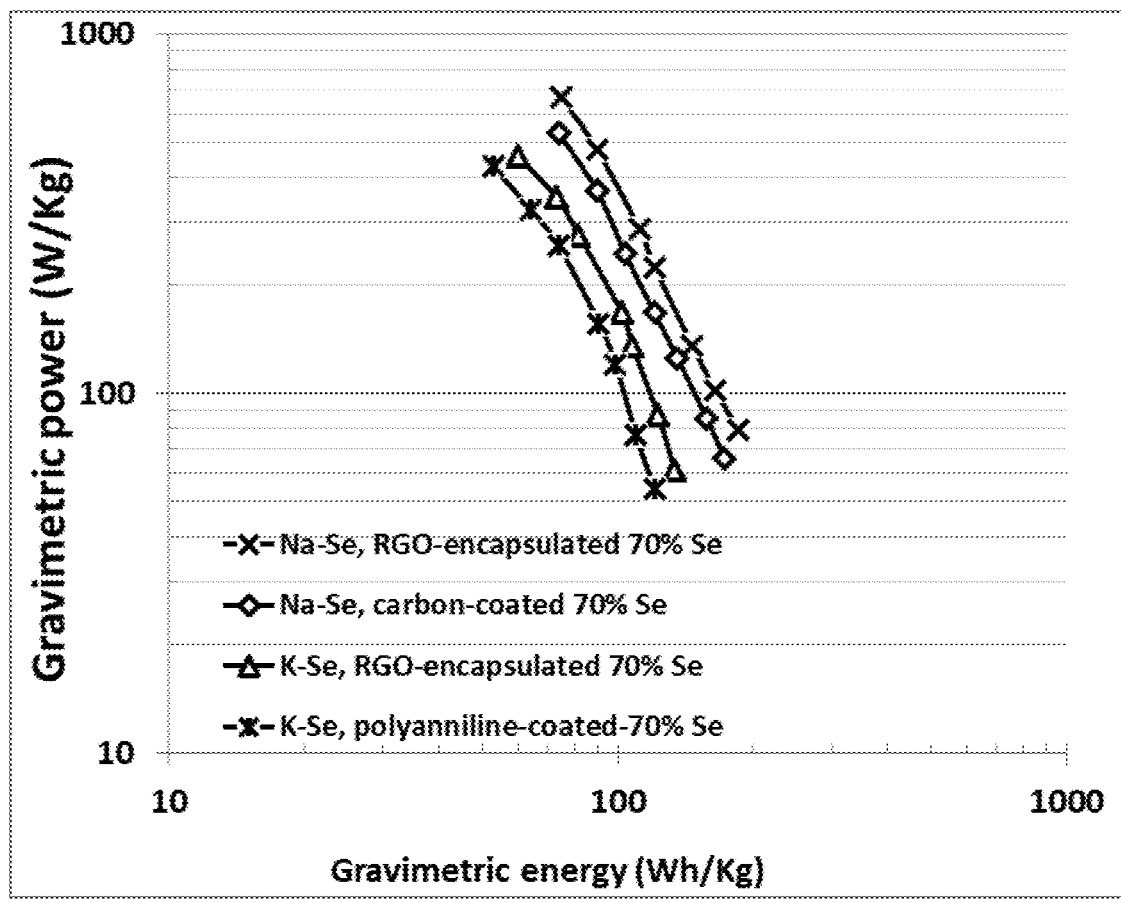
FIG. 5 Ragone plots (cell power density vs. cell energy density) of 4 alkali metal-selenium cells: a Na—Se cell featuring RGO-encapsulated selenium nanoparticles (70% Se) as the cathode active material, a Na—Se cell featuring a cathode containing carbon-coated Se nanoparticles (70% Se), a K—Se cell featuring a cathode containing RGO-encapsulated selenium nanowires (70% Se), and a K—Se cell featuring a cathode containing polyaniline-coated Se nanowires (70% Se).

FIG. 5 shows the Ragone plots (cell power density vs. cell energy density) of 4 alkali metal-selenium cells: a Na—Se cell featuring RGO-encapsulated selenium nanoparticles (70% Se) as the cathode active material, a Na—Se cell featuring a cathode containing carbon-coated Se nanoparticles (70% Se), a K—Se cell featuring a cathode containing RGO-encapsulated selenium nanowires (70% Se), and a K—Se cell featuring a cathode containing polyaniline-coated Se nanowires (70% Se). Again, for both the Na—Se and K—Se batteries, the battery cell that contains graphene-encapsulated Se exhibits a consistently higher energy density and power density as compared to other types of alkali metal-selenium cells.

We claim:

1. A graphene-enabled hybrid particulate for use as a cathode active material of an alkali metal battery wherein said hybrid particulate comprises a single or a plurality of graphene sheets and a plurality of fine selenium particles or coatings, having a diameter or thickness from 0.5 nm to 10 µm, and the graphene sheets and the selenium particles or coatings are mutually bonded or agglomerated into said hybrid particulate containing an exterior graphene sheet or multiple exterior graphene sheets embracing said selenium particles or coatings, and wherein said graphene is in an amount of from 0.01% to 30% by weight based on the total weight of graphene and selenium combined, wherein said graphene-enabled hybrid particulate contains at least one interior graphene sheet.

2. The hybrid particulate of claim 1, wherein said graphene sheets contain a pristine graphene material having less than 0.01% by weight of non-carbon elements or a non-pristine graphene material having 0.01% to 20% by weight of non-carbon elements, wherein said non-pristine graphene is selected from graphene oxide, reduced graphene oxide, graphene fluoride, graphene chloride, graphene bromide, graphene iodide, hydrogenated graphene, nitrogenated graphene, boron-doped graphene, nitrogen-doped graphene, chemically functionalized graphene, or a combination thereof.

3. The hybrid particulate of claim 2, wherein said chemically functionalized graphene contains a functional group attached thereto to make the graphene sheets in a liquid medium exhibit a negative Zeta potential from −55 mV to −0.1 mV.

4. The hybrid particulate of claim 2, wherein said chemically functionalized graphene comprises graphene sheets having a chemical functional group selected from alkyl or aryl silane, alkyl or aralkyl group, hydroxyl group, carboxyl group, carboxylic group, amine group, sulfonate group (—SO$_3$H), aldehydic group, quinoidal, fluorocarbon, or a combination thereof.

5. The hybrid particulate of claim 2, wherein said chemically functionalized graphene comprises graphene sheets having a chemical functional group selected from the group consisting of 2-azidoethanol, 3-azidopropan-1-amine, 4-(2-azidoethoxy)-4-oxobutanoic acid, 2-azidoethyl-2-bromo-2-methylpropanoate, chlorocarbonate, azidocarbonate, dichlorocarbene, carbene, aryne, nitrene, (R—)-oxycarbonyl nitrenes, where R =any one of the following groups,

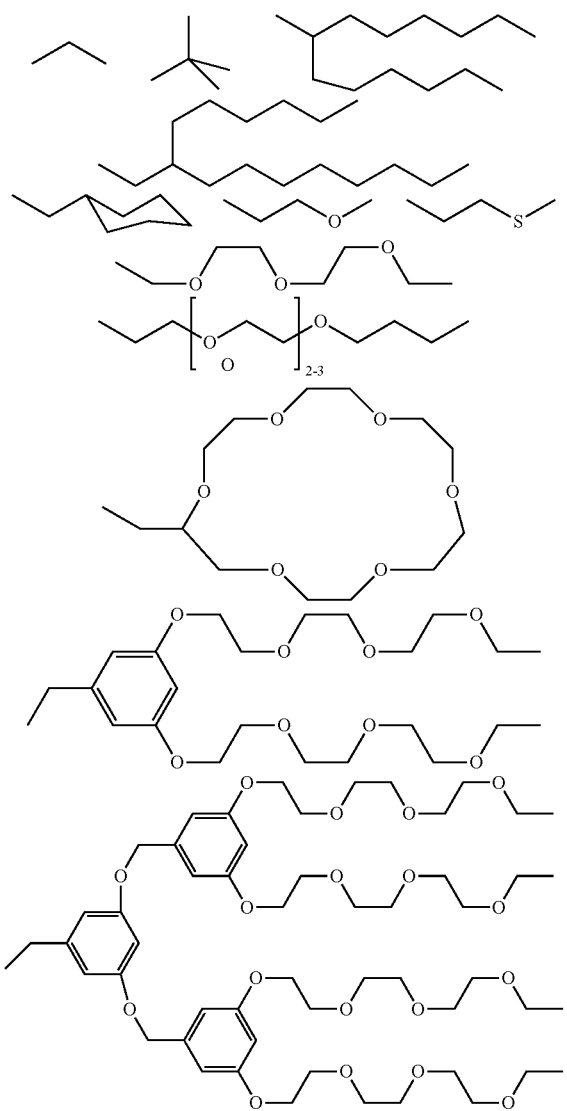

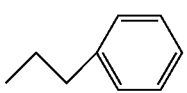 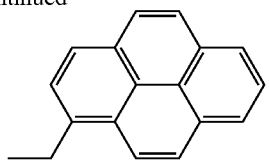

and combinations thereof.

6. The hybrid particulate of claim 2, wherein said chemically functionalized graphene comprises graphene sheets having a chemical functional group selected from an oxygenated group selected from the group consisting of hydroxyl, peroxide, ether, keto, and aldehyde.

7. The hybrid particulate of claim 2, wherein said chemically functionalized graphene comprises graphene sheets having a chemical functional group selected from the group consisting of —$SO_3H$, —COOH, —$NH_2$, —OH, —R'CHOH, —CHO, —CN, —COCl, halide, —COSH, —SH, —COOR', —SR', —$SiR'_3$, —$Si(-OR'-)_yR'_{3-y}$, —$Si(-O-SiR'_2-)OR'$, —R", Li, $AlR'_2$, Hg—X, $TlZ_2$ and Mg—X; wherein y is an integer equal to or less than 3, R' is hydrogen, alkyl, aryl, cycloalkyl, or aralkyl, cycloaryl, or poly(alkylether), R" is fluoroalkyl, fluoroaryl, fluorocycloalkyl, fluoroaralkyl or cycloaryl, X is halide, and Z is carboxylate or trifluoroacetate, and combinations thereof.

8. The hybrid particulate of claim 2, wherein said chemically functionalized graphene comprises graphene sheets having a chemical functional group selected from the group consisting of amidoamines, polyamides, aliphatic amines, modified aliphatic amines, cycloaliphatic amines, aromatic amines, anhydrides, ketimines, diethylenetriamine (DETA), triethylene-tetramine (TETA), tetraethylene-pentamine (TEPA), polyethylene polyamine, polyamine epoxy adduct, phenolic hardener, non-brominated curing agent, non-amine curatives, and combinations thereof.

9. The hybrid particulate of claim 2, wherein said chemically functionalized graphene comprises graphene sheets having a chemical functional group selected from OY, NHY, O=C—OY, P=C—NR'Y, O=C—SY, O=C—Y, —CR'1-OY, N'Y or C'Y, and Y is a functional group of a protein, a peptide, an amino acid, an enzyme, an antibody, a nucleotide, an oligonucleotide, an antigen, or an enzyme substrate, enzyme inhibitor or the transition state analog of an enzyme substrate or is selected from R'—OH, R'—$NR'_2$, R'SH, R'CHO, R'CN, R'X, $R'N^+(R')_3X^-$, $R'SiR'_3$, $R'Si(-OR'-)_y$, $R'_{3-y}$, $R'Si(-O-SiR'_2-)OR'$, R'—R", R'—N—CO, $(C_2H_4O-)_wH$, $(-C_3H_6O-)_wH$, $(-C_2H_4O)_w-R'$, $(C_3H_6O)_w-R'$, R', and w is an integer greater than one and less than 200.

10. The hybrid particulate of claim 1, wherein said particulate further comprises a second element selected from Sn, Sb, Bi, S, Te, or a combination thereof and the weight of said second element is less than the weight of selenium.

11. The hybrid particulate of claim 1, wherein said selenium coatings or particles have a thickness or diameter from 0.5 nm to 100 nm.

12. The hybrid particulate of claim 1, having a diameter from 100 nm to 100 μm.

13. The hybrid particulate of claim 1, having a diameter from 1.0 μm to 50 μm.

14. The hybrid particulate of claim 1, having a substantially spherical or ellipsoidal shape.

15. The hybrid particulate of claim 1, wherein said hybrid particulate further contains interior graphene sheets in physical contact with said selenium particles or coatings and with said exterior graphene sheet.

16. The hybrid particulate of claim 1 wherein the graphene amount is from 0.1% to 10% by weight of the total weight of graphene and selenium combined.

17. The hybrid particulate of claim 1 wherein said hybrid particulate has an electrical conductivity greater than $10^{-4}$ S/cm.

18. The hybrid particulate of claim 1, wherein said selenium particles are in a nanowire, nanotube, nanodisc, nanoribbon, nanobelt, or nanoplatelet form having a diameter or thickness smaller than 100 nm.

19. The hybrid particulate of claim 1, further comprising a carbon material in electronic contact with said selenium and a graphene sheet.

20. The hybrid particulate of claim 1, further comprising a carbon material coated on at least one of said selenium particles or coatings, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

21. A powder mass containing a plurality of particulates as defined in claim 1.

22. An alkali metal-selenium battery cathode containing the hybrid particulate of claim 1 as a cathode active material.

23. An alkali metal-selenium battery containing an anode, a cathode, an electrolyte in ionic contact with the cathode and the anode, wherein the cathode comprises the hybrid particulate of claim 1.

24. The alkali metal-selenium battery of claim 23, which contains a rechargeable lithium-selenium cell, sodium-selenium cell, potassium-selenium cell, lithium ion-selenium cell, sodium ion-selenium cell, or potassium ion-selenium cell.

25. The alkali metal-selenium battery of claim 23, wherein said electrolyte is selected from polymer electrolyte, polymer gel electrolyte, composite electrolyte, ionic liquid electrolyte, non-aqueous liquid electrolyte, soft matter phase electrolyte, solid-state electrolyte, or a combination thereof.

26. A graphene-enabled hybrid particulate for use as an alkali metal battery cathode active material, wherein said hybrid particulate comprises a single or a plurality of graphene sheets and a single selenium particle, having a diameter or thickness from 0.5 nm to 30 μm, and the graphene sheet or plurality of graphene sheets encapsulate the selenium particle and wherein said graphene sheets contain a pristine graphene material having less than 0.01% by weight of non-carbon elements or a non-pristine graphene material having 0.01% to 20% by weight of non-carbon elements, wherein said non-pristine graphene is not graphene oxide or reduced graphene oxide and is selected from graphene fluoride, graphene chloride, graphene bromide, graphene iodide, hydrogenated graphene, nitrogenated graphene, boron-doped graphene, nitrogen-doped graphene, chemically functionalized graphene, or a combination thereof and wherein said graphene is in an amount of from 0.01% to 30% by weight based on the total weight of graphene and selenium combined, wherein said graphene-enabled hybrid particulate contains at least one interior graphene sheet.

27. The hybrid particulate of claim 26, wherein said particulate further comprises a second element selected from Sn, Sb, Bi, S, Te, or a combination thereof and the weight of said second element is less than the weight of selenium.

28. The hybrid particulate of claim 26, wherein said selenium particles are in a nanowire, nanotube, nanodisc, nanoribbon, nanobelt, or nanoplatelet form having a diameter or thickness smaller than 100 nm.

29. The hybrid particulate of claim 26, further comprising a carbon material coated on said selenium particle, wherein said carbon material is selected from polymeric carbon, amorphous carbon, chemical vapor deposition carbon, carbon black, acetylene black, activated carbon, fine expanded graphite particle with a dimension smaller than 100 nm, artificial graphite particle, natural graphite particle, or a combination thereof.

30. A powder mass containing a plurality of particulates as defined in claim 26.

31. An alkali metal-selenium battery cathode containing the hybrid particulate of claim 26 as a cathode active material.

32. An alkali metal-selenium battery containing an anode, a cathode, an electrolyte in ionic contact with the cathode and the anode, wherein the cathode comprises the hybrid particulate of claim 26.

33. The alkali metal-selenium battery of claim 32, wherein said electrolyte contains an alkali salt selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoro-metasulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium oxalyldifluoroborate ($LiBF_2C_2O_4$), lithium nitrate ($LiNO_3$), Li-fluoro-alkyl-phosphates ($LiPF3(CF_2CF_3)_3$), lithium bisperfluoro-ethysulfonylimide (LiBETI), an ionic liquid salt, sodium perchlorate ($NaClO_4$), potassium perchlorate ($KClO_4$), sodium hexafluorophosphate ($NaPF_6$), potassium hexafluorophosphate ($KPF_6$), sodium borofluoride ($NaBF_4$), potassium borofluoride ($KBF_4$), sodium hexafluoroarsenide, potassium hexafluoroarsenide, sodium trifluoro-metasulfonate ($NaCF_3SO_3$), potassium trifluoro-metasulfonate ($KCF_3SO_3$), bis-trifluoromethyl sulfonylimide sodium ($NaN(CF_3SO_2)_2$), sodium trifluoromethanesulfonimide (NaTFSI), bis-trifluoromethyl sulfonylimide potassium ($KN(CF_3SO_2)_2$), or a combination thereof.

34. The alkali metal-selenium battery of claim 32, wherein said solvent is selected from ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene or methyl acetate (MA), fluoroethylene carbonate (FEC), vinylene carbonate (VC), allyl ethyl carbonate (AEC), 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, room temperature ionic liquid, or a combination thereof.

* * * * *